(12) United States Patent
Gnanasekaran

(10) Patent No.: US 8,635,375 B2
(45) Date of Patent: Jan. 21, 2014

(54) REMOTE F_PORTS

(75) Inventor: Sathish Kumar Gnanasekaran, Sunnyvale, CA (US)

(73) Assignee: Brocade Communications Systems, Inc., San Jose, CA (US)

(*) Notice: Subject to any disclaimer, the term of this patent is extended or adjusted under 35 U.S.C. 154(b) by 930 days.

(21) Appl. No.: 12/759,880

(22) Filed: Apr. 14, 2010

(65) Prior Publication Data

US 2011/0255533 A1   Oct. 20, 2011

(51) Int. Cl.
   *G06F 3/00* (2006.01)
   *H04L 12/28* (2006.01)

(52) U.S. Cl.
   USPC .............................................. 710/3; 370/389

(58) Field of Classification Search
   USPC .......................................................... 710/3
   See application file for complete search history.

(56) References Cited

U.S. PATENT DOCUMENTS

| | | | |
|---|---|---|---|
| 5,363,367 A | 11/1994 | Kobayashi et al. | |
| 6,401,128 B1 | 6/2002 | Stai et al. | |
| 6,470,007 B1 | 10/2002 | Berman | |
| 6,608,819 B1 | 8/2003 | Mitchem et al. | |
| 6,763,417 B2 | 7/2004 | Paul et al. | |
| 6,941,260 B2 | 9/2005 | Emberty et al. | |
| 6,985,490 B2 | 1/2006 | Czeiger et al. | |
| 7,068,651 B2 | 6/2006 | Schmidt et al. | |
| 7,103,704 B2 | 9/2006 | Chatterjee | |
| 7,103,711 B2 | 9/2006 | Valdevit | |
| 7,107,347 B1 | 9/2006 | Cohen | |
| 7,305,069 B1 | 12/2007 | Day | |
| 7,340,167 B2 | 3/2008 | McGlaughlin | |
| 7,385,982 B2 | 6/2008 | Warden et al. | |
| 7,542,676 B2 | 6/2009 | McGlaughlin | |
| 7,577,134 B2 | 8/2009 | Gopal Gowda et al. | |
| 7,916,628 B2 * | 3/2011 | Ghosh et al. | 370/218 |
| 7,948,920 B2 * | 5/2011 | Ghosh et al. | 370/254 |
| 8,032,931 B2 * | 10/2011 | Mehendale et al. | 726/8 |
| 2002/0023184 A1 | 2/2002 | Paul | |
| 2002/0116564 A1 | 8/2002 | Paul et al. | |
| 2002/0161567 A1 | 10/2002 | Emberty et al. | |
| 2002/0191649 A1 | 12/2002 | Woodring | |
| 2003/0058853 A1 | 3/2003 | Gorbatov et al. | |
| 2003/0076788 A1 | 4/2003 | Grabauskas et al. | |
| 2003/0189935 A1 | 10/2003 | Warden et al. | |
| 2004/0013092 A1 | 1/2004 | Betker et al. | |
| 2004/0013125 A1 | 1/2004 | Betker et al. | |

(Continued)

OTHER PUBLICATIONS

Fibre Channel Methodologies for Interconnects (FC-MI) Rev. 1.8, NCITS working draft proposed Technical Report, Sep. 28, 2001.

(Continued)

*Primary Examiner* — Titus Wong
(74) *Attorney, Agent, or Firm* — Wong, Cabello, Lutsch, Rutherford & Brucculeri, L.L.P.

(57) ABSTRACT

Disclosed techniques allow for devices of a SAN to login to an F_port of a different switch than the switch to which the device is physically connected. These techniques allow moving some of the capability from an edge switch to another switch in the fabric, with the edge switch transporting incoming frames from the device to the other switch and thence across the SAN to the destination device, and similarly transporting outgoing frames from the more-capable switch to the edge switch for delivery to the device connected to the edge switch. In some embodiments, the edge switch may determine the other switch to which the device should login based on properties of the other switch.

26 Claims, 5 Drawing Sheets

(56) References Cited

U.S. PATENT DOCUMENTS

| | | |
|---|---|---|
| 2004/0024905 A1 | 2/2004 | Liao et al. |
| 2004/0081186 A1 | 4/2004 | Warren et al. |
| 2004/0151174 A1 | 8/2004 | Del Signore et al. |
| 2005/0018673 A1 | 1/2005 | Dropps et al. |
| 2005/0025075 A1 | 2/2005 | Dutt et al. |
| 2005/0044354 A1 | 2/2005 | Hagerman |
| 2005/0198523 A1 | 9/2005 | Shanbhag et al. |
| 2005/0232285 A1 | 10/2005 | Terrell et al. |
| 2006/0034302 A1 | 2/2006 | Peterson |
| 2006/0092932 A1 | 5/2006 | Ghosh et al. |
| 2007/0002883 A1 | 1/2007 | Edsall et al. |
| 2007/0058619 A1 | 3/2007 | Gopal Gowda et al. |
| 2007/0091903 A1 | 4/2007 | Atkinson |
| 2007/0130295 A1* | 6/2007 | Rastogi et al. ............... 709/220 |
| 2008/0028096 A1 | 1/2008 | Henderson et al. |
| 2011/0051733 A1* | 3/2011 | Hirata ........................ 370/400 |
| 2011/0228670 A1* | 9/2011 | Sasso et al. .................. 370/221 |

OTHER PUBLICATIONS

Fibre Channel Methodologies for Interconnects—2 (FC-MI-2) Rev. 2.60, NCITS working draft proposed Technical Report, Jun. 7, 2005.

American National Standard for Information Technology; "Fibre Channel—Fabric Generic Requirements (FC-FG)", Secretariat: Information Technology Industry Council; Approved Dec. 4, 1996: American Nation Standards Institute, Inc.

Fibre Channel Switch Fabric (FC-SW) Rev. 3.3, NCITS working draft proposed American National Standard for Information Technology, Oct. 21, 1997.

Fibre Channel Switch Fabric—2 (FC-SW-2) Rev 5.3, NCITS working draft proposed American National Standard for Information Technology, Jun. 26, 2001.

Fibre Channel Switch Fabric—3 (FC-SW-3) Rev 6.6, NCITS working draft proposed American National Standard for Information Technology, Dec. 16, 2003.

Fibre Channel Physical and Signaling Interface (FC-PH) Rev. 4.3, working draft proposed American National Standard for Information Systems, Jun. 1, 1994.

Fibre Channel Link Services (FC-LS) Rev 1.51, INCITS working draft proposed American National Standard for Information Technology, Sep. 6, 2006.

Brocade Access Gateway, An Innovative Platform for Connecting Servers to SANs, © 2008 Brocade Communications Systems, Inc.

Storage Area Network, Quick Configuration Guide: Access Gateway NPIV with EFCM Management, © 2007 Brocade Communications Systems, Inc.

HP Virtual Connect technology for the HP BladeSystem c-Class, technology brief, 4th edition, © 2007, 2009, 2010 Hewlett-Packard Development Company, L.P.

HP Virtual Connect Fibre Channel Networking Scenarios Cookbook, Part No. 508932-001, Mar. 2009 (First Edition), © 2009 Hewlett-Packard Development Company, L.P.

HP Virtual Connect for c-Class BladeSystem Setup and Installation Guide, Part No. 519213-007, Sep. 2009 (Fourth Edition), © 2009 Hewlett-Packard Development Company, L.P.

HP BladeSystem c-Class Virtual Connect Support Utility Version 1.4.1 User Guide, Part No. 577288-001, Sep. 2009 (First Edition), © 2009 Hewlett-Packard Development Company, L.P.

HP virtual Connect for c-Class BladeSystem Version 2.30 User Guide, Part No. 579007-002, Oct. 2009 (Second Edition), © 2009 Hewlett-Packard Development Company, L.P.

Cisco Fabric Manager Interfaces Configuration Guide, Cisco Fabric Manager Release 5.0(1a), Feb. 2010, © 2010 Cisco Systems, Inc.

Brocade Fibre Channel Product Feature Summary—Core Technology and Data Center Fabric Technology.

Brocade Fabric OS Product Line Guide, Fibre Channel Solutions, Leading-Edge Solutions for Next-Generation Data Centers, © 2009 Brocade Communications Systems, Inc.

Storage Area Network, Virtualizing Embedded Switches: The Next Generation in SAN Connectivity, © 2007 Brocade Communications Systems, Inc.

"HP Virtual Connect for Dummies" by Eric Butow, Bill Dicke & John Joyal; © 2009 Wiley Publishing, Inc.

* cited by examiner

REMOTE F_PORTS

TECHNICAL FIELD

The present invention relates to the field of computer networking, and in particular to a technique for allowing devices to login to a remote F_port on a network switch.

BACKGROUND ART

Storage area networks (SANs) are typically implemented to interconnect data storage devices and data servers or hosts, using network switches to provide interconnectivity across the SAN. SANs may be complex systems with many interconnected computers, switches, and storage devices. The switches are typically configured into a switch fabric, and the hosts and storage devices connected to the switch fabric through ports of the network switches that comprise the switch fabric. Most commonly, Fibre Channel (FC) protocols are used for data communication across the switch fabric, as well as for the setup and teardown of connections to and across the fabric, although these protocols may be implemented on top of Ethernet or Internet Protocol (IP) networks.

Typically, hosts and storage devices (generically, devices) connect to switches through a link between the device and the switch, with an node port (N_port) of the device connected to one end of the link and a fabric port (F_port) of a switch connected to the other end of the link. The N_port describes the capability of the port as an associated device to participate in the fabric topology. Similarly, the F_port describes the capability of the port as an associated switch. As each device connects to the fabric, FC protocols define a fabric login mechanism to allow the N_ports and F_ports to negotiate addresses and service parameters. Further login mechanisms are defined by FC protocols to establish sessions between two N_ports and to establish sessions between processes running on devices using connected N_ports. As part of fabric login, worldwide names (WWNs) are assigned to ports and devices. In addition, each port is assigned an address, also known as a port ID, that is used in FC protocols for identifying the source and destination of a frame of data. The switches can then use the port IDs for determining the outgoing port to which an incoming frame should be sent. A name server provides a mechanism for devices to register their presence in the fabric, submitting the port ID, WWN, port type, and class of service to a database that is replicated across the fabric to name servers on all of the switches in the fabric.

Over time, SANs have become more complex, with fabrics involving multiple switches, connected with inter-switch links (ISLs). In some SANs, a core group of switches may provide backbone switching for fabric interconnectivity, with few or no devices directly connected to the core switches, while a number of edge switches provide connection points for the devices or devices of the SAN. Additional layers of switches may also exist between the edge switches and the core switches.

These edge switches may not need the full capability of the core switches, but conventional switches have often been unable to offer reduced capability, so that edge switches have been used that are more complex than would be desirable. Thus, the cost of edge switches has been greater then desired, and the SAN resources expended for managing such switches may be more than would be necessary if reduced-capability switches were available.

In addition, virtualization has affected the manageability of SANs. Virtual devices may from time to time migrate from one physical device to another physical device or from one N_port to another N_port in a multiply connected physical device. Thus, fabric services such as name services have required more resources to handle the migration than would be desirable.

SUMMARY OF INVENTION

In brief, disclosed techniques allow devices to login to an F_port of a different switch than the switch to which the device is physically connected. These techniques allow moving some of the capability from an edge switch to another switch in the fabric, with the other switch providing fabric services for the edge switch and the edge switch transporting incoming frames from the device to the other switch and thence across the SAN to the destination device, and similarly transporting outgoing frames from the more-capable switch to the edge switch for delivery to the device connected to the edge switch. In some embodiments, the edge switch may determine the other switch to which the device should login based on properties of the other switch.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation.

Although the following description is written in terms of a host performing a login to an F_port of a remote switch, storage devices and any other device that may connect to a SAN may use the same functionality to login to switches in the SAN 100.

Figure 1:
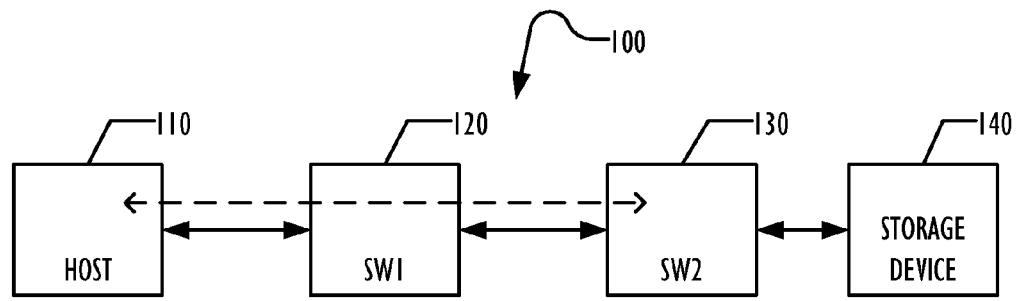
FIG. 1 is a block diagram of a SAN according to one embodiment.

FIG. 1 is a block diagram that illustrates a SAN 100 according to one embodiment. A host 110 is physically connected to switch 120, but for most purposes acts as if it were physically connected to switch 130, which provides all fabric services for host 110. The host 110 is logged in to switch 130 and some or all fabric services related to host 110 and the switch 120 are performed by switch 130, other than the transport of traffic between host 110 and switch 130, which is handled by switch 120. Although described herein as a host 110, storage devices and any other device that may be connected to a SAN may also be remotely connected through another switch in the SAN, similar to the host 110. A storage device 140 is also illustrated as connected to switch 130, allowing the host 110 to access the storage device 140 across the SAN 100. In some of the following figures, the storage device 140 is omitted for clarity.

The association and transport of control and data frames between the physical port on switch 122 which host 110 is connected and the remote F_port on switch 130 may be accomplished in multiple ways. In some embodiments, the switch 120 may forward frames between host 110 and switch 130 across one or more ISLs. The ISLs carrying traffic between switches 120 and 130 may be physical or logical ISLs or any combination thereof. In some embodiments, switch 120 may create a tunnel across a logical ISL created between a logical port on switch 120 and a logical port on switch 130. In some embodiments, the switch 120 may forward frames to the switch 130 over a plurality of cells, with some frames taking different paths between switches 120 and 130 than other frames.

These embodiments may allow switch 120 to be a switch with lesser functionality than switch 130, such as are described in co-owned U.S. patent application Ser. No. 11/216,903, filed Aug. 31, 2008, which is incorporated herein by reference in its entirety for all purposes. The switch 120 is typically an edge or leaf switch, and the remote login functionality allows reducing costs of acquisition and maintenance of switch 120, while concentrating functionality in switch 130, typically a core switch of a SAN 100. The switch 120 may be a full-function switch however, allowing some hosts or storage devices to login to the switch 120 and some hosts or storage devices to login to the switch 130 remotely through switch 120.

By moving functionality for providing fabric services from switch 120 to switch 130, scalability of the switch fabric may also be improved. Lower-cost edge switches 120 may be used. In addition, switch fabric scalability is typically limited by the capabilities of the least capable switch in the fabric, thus scalability may be improved by the movement of fabric services to the more capable remote switch.

Furthermore, by moving fabric services and other related functionality to remote switches, the ability to migrate virtual machines from one physical switch to another is improved, because the fabric services associated with the migrated virtual machine handled by the remote switch 130 do not need to be migrated.

Although in the diagram of FIG. 1, the switch 120 is directly connected to switch 130, in some embodiments, such as illustrated below in FIG. 6, additional transit switches may intervene between switches 120 and 130, which may not be aware of remote login that is accomplished across the transit switches. As indicated above, data and control frames in such an embodiment may not traverse a single path of ISLs between the switches 120 and 130, but individual frames may take different paths of the control of routing algorithms in the switches 120 and 130 and intervening transit switches. Furthermore, in the typical SAN, multiple switches may be able to accept remote logins, and the switch 120 may provide a way to determine which switch should accept a remote login request and to manage the movement of connections to switch 130 should its functionality move to a different switch.

In embodiments that allow partitioning a physical switch into logical switches, such as described in co-owned U.S. patent application Ser. No. 12/575,603, filed Oct. 8, 2009, which is incorporated by reference herein in its entirety for all purposes, switches 120 and 130 may be logical switches of one or more physical switches. The connection between switches 120 and 130 in such embodiments may be a dedicated PISL or a LISL.

In embodiments where the switch 120 forwards frames between the switch 120 and the switch 130, the switch 120 may use conventional Fibre Channel Routing (FCR) protocols to forward frames between the switch 130 and the host 110. Unlike conventional FCR forwarding, which only forwards frames after a fabric login (FLOGI) has occurred, the switch 120 may forward FLOGI frames between the host 110 and the switch 130, including frames that respond to the FLOGI request to the host 110 with fabric information, such as a fabric address identifier.

Figure 2:
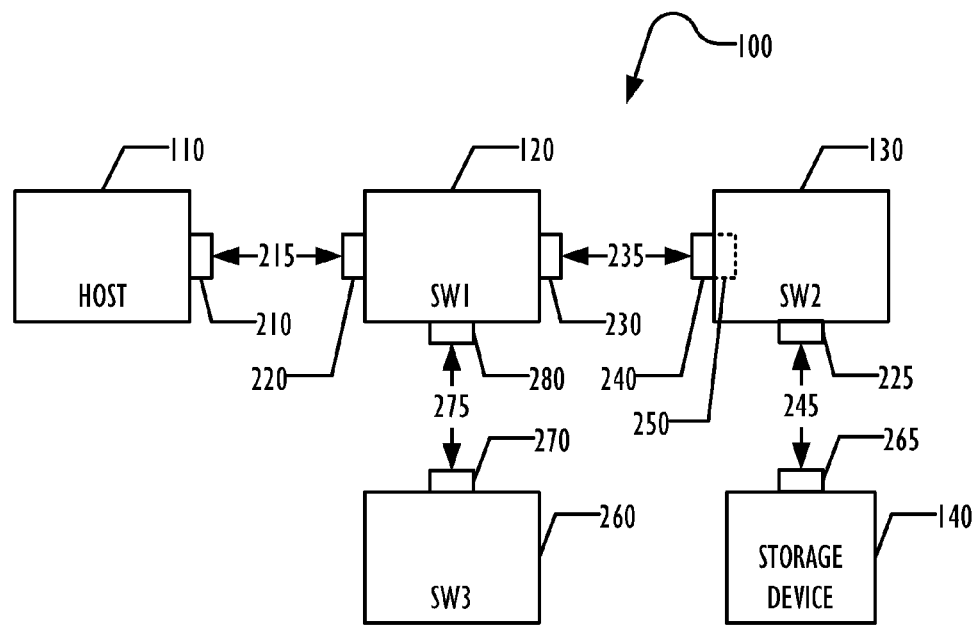
FIG. 2 is a block diagram of the SAN of FIG. 1 is an additional network switch according to one embodiment.

FIG. 2 is a block diagram that illustrates an embodiment using FCR forwarding. As illustrated, the host 110 is connected to switch 120 by link 215. An N_port 210 and an F_port 220 serve as endpoints of the link 215. Switch 120 is connected to switch 130 by ISL 235. Expansion ports (E_ports) 230 and 240 serve as endpoints of the ISL 235. A logical F_port 250, which may be associated with the Eport 240, serves as the remote F_port through which the host 110 logs in to switch 130. Another switch 260 is connected to switch 120 via ISL 275, and E_ports 270 and 280.

Because the switch 120 connects to the switch 130 using E_ports 230 and 240, the switch 120 is a part of the same switch fabric as switch 130, although some or all of the fabric services that would otherwise be provided by switch 120 are provided by switch 130, and the switch 130 does not need to support N_Port_ID_Virtualization (NPIV). The switch 120 and the switch 130 are illustrated in FIG. 2 as directly connected for clarity of the drawing, but, unlike a system using NPIV, the switches 120 and 130 may connect through one or more intervening transit switches, as illustrated in FIG. 6 and described in more detail below.

In some embodiments, the switch 120 may be configured to forward all frames received on port 220 to port 230 to allow the remote login functionality, including all of the FLOGI traffic in addition to the data traffic that may occur after the remote login. In one embodiment, the switch 120 may be pre-configured with routing tables for such forwarding prior to the attempt by the host 110 to login. In other embodiments, the switch 120 may not establish the identity of the remote login switch 130 or the routing tables for forwarding traffic from the host 110 until the host 110 begins sending FLOGI frames to the port 220 over the link 215.

As illustrated in FIG. 2, both switches 130 and 260 may be capable of accepting remote login by host 110. A protocol for determining the appropriate switch in the SAN 100 to accept the remote login may be used. The protocol may employ Fabric Shortest Path First (FSPF) functionality or any other desired technique to determine which switch in the SAN 100 that is capable of performing remote login should be connected to as switch 130. In addition, the decision on which of switches 130 and 260 should be used for remote login by host 110 may depend upon properties announced by switches 130 and 260 to the switch 120.

In one embodiment, each of a plurality of switches and a switch network may announce certain properties. A criteria may be defined for selecting the switch 130 from the plurality of switches based on the announced switch properties, and the switch 120 may select the switch 130 based on the defined criteria.

In one embodiment, a state machine maybe employed in the switch 120 software for determining which switch in the SAN 100 to use for the remote login.

In some embodiments, a state machine may be employed in the switch 120 software as part of the remote login protocol, to establish routing and, if needed, to establish associations between the physical F_port 220 of switch 120 and the logical F_port 250 of switch 130. In the event that no switch is available to serve as switch 130 for the remote login, error indications may be returned to the host 110 from the switch 120, as well as made available to management services of the switch 120.

In some embodiments, the ISL 235 between switch 120 and switch 130 may be dedicated to the remote session between the host 110 and the switch 130. In other embodiments, the ISL 235 may carry other traffic between the switch 120 and the host 110. For example, in one embodiment, another host (not shown) may login to switch 120, sending traffic that traverses the ISL 235 to switch 130 to reach the storage device 140, connected to switch 130 via link 245, F_port 225, and N_port 265. In another example, another host (not shown) may remotely login to another logical port on switch 130 (not shown) through switch 120, with the traffic for the other host also forwarded across ISL 235. Alternately, the switch 120 may contain other E_ports and serve as a transit switch between other switches (not shown) and the switch 130, using the ISL 235 for such traffic.

The switch 120 may be a limited function switch or a full-function switch, as desired. In some embodiments, the switch 120 may have only enough functionality to allow the processing of remote logins and traffic to the remote F_port 250, with all fabric services provided by switch 130, and may have one or more local ports for physical connection by hosts for remote login processing. The port 220, although described herein as an F_port, may be capable of conventional local F_port logins or may have limited functionality that only allows for a remote login connection via the port 220.

In the switch 130, logical port 250 serves for the remote login by host 110. In some embodiments, logical F_port 250 is associated with physical E_port 240 In one embodiment, the logical port 250 is pre-associated with the physical port 240. In another embodiment, the logical port 250 is associated with the physical port 240 upon receipt of FLOGI frames forwarded to the switch 120 from the host 110. A state machine may be used to associate the logical port 250 with the physical port 240 in some embodiments.

In some embodiments, the switch 120 may identify itself to the switch 130 as a limited function switch, to establish the capability of the switch 120 and its operational mode, for example, negotiation and advertising of capabilities between switches 120 and 130. Any convenient protocol may be used for the initialization of communications between the switch 120 and the switch 130 for this purpose.

Figure 3:
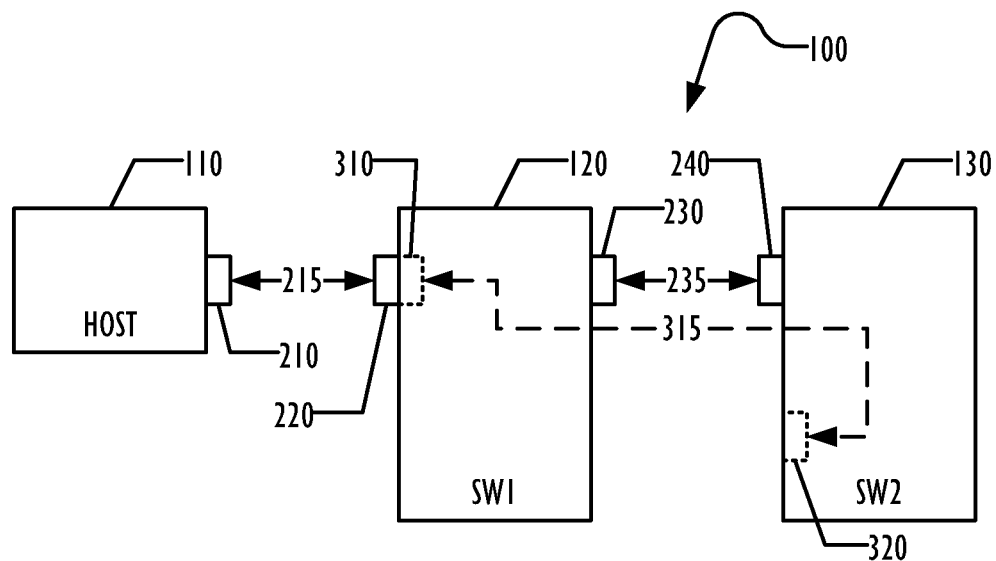
FIG. 3 is a block diagram of the SAN of FIG. 1 according to one embodiment that uses a logical link transport of frames.

FIG. 3 is a block diagram that illustrates another embodiment, in which a LISL is established between switch 120 and the switch 130 for the traffic associated with host 110. In this embodiment, host 110 connects via link 215 and ports 210 and 220 as described above. In this embodiment, however, instead of forwarding the frames between the host 110 and the switch 130 using FCR routing, the switch 120 creates a LISL 315 between logical port 310 of the switch 120 and logical port 320 of the switch 130. Traffic for the LISL 315 is tunneled across the PISL 235. In one embodiment, the tunneling is achieved using FC over FC encapsulation, adding one or more headers to each data frame that is transmitted over the LISL 315 to allow the proper routing of the encapsulated frame to the appropriate switch across the PISLs that provide transport services for the LISL 315. For example, the switch 120 would add one or more headers to an encapsulated frame indicating its destination is logical port 320 of switch 130 with one or more headers directing the frame to port 240 of switch 130. When switch 130 receives the frame, it may then decapsulate the frame and route the decapsulated frame to the intended destination logical port 320.

Although generally described herein is a logical ISL 315, the association between the physical F_port 220 and the logical F_port 320 may not have all the characteristics of a logical ISL, and no fixed path may exist between the physical F_port 220 and logical F_port 320. For example, in one embodiment, logical port 310 in the edge switch 120 may be omitted, and the association between the ports may be established without the establishment of a logical ISL. The encapsulation and decapsulation necessary for transport between switches 120 and one 130, although similar to that used for a logical ISL, may be performed differently and using different hardware and software components than used for creating and routing traffic across a logical ISL. In other embodiments, a logical ISL may be created and dedicated to the remote login functionality.

In one embodiment, the logical port 310 is associated with physical port 220 in the switch 120. The logical port 320 in switch 130 may be associated with the physical port 240 used for the PISL 225 that connects switch 120 and switch 130, or may be a logical port not associated with any physical port.

Logically, the host 110 logs in to the fabric at logical port 320 of switch 130, even though host 110 is physically connected to port 220 of switch 120. Fabric services are provided by switch 130 as if the host 110 was connected to port 320 of switch 130, instead of switch 120. The host 110 will be part of a domain assigned to switch 130.

Figure 4:
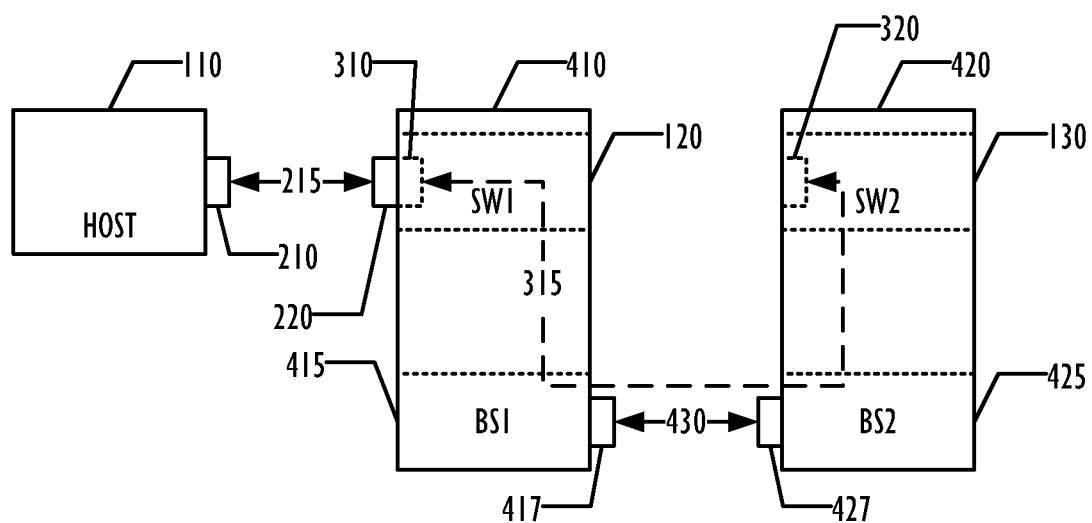
FIG. 4 is a block diagram of the SAN of FIG. 1 according to another embodiment that uses a logical link or transfer frames.

In a further embodiment, illustrated in FIG. 4, switches 120 and 130 may be logical switches partitioned from physical switches 410 and 420. In this embodiment, the LISL 315 connecting logical port 310 in switch 120 and logical port 320 of switch 130 may use transport services provided by an extended inter-switch link (XISL) 430, which is a PISL connecting physical ports 417 and 427 of base switch 415 and base switch 425, respectively. As explained above, the setup and teardown of LISL 315 may be accomplished in one embodiment using a state machine that implements a LISL establishment protocol. In the embodiment illustrated in FIG. 4, the base switches 415 and 425 would typically have no access to the frames transported across LISL 315. In a yet further embodiment, the frames transported between physical port 220 and logical port 320 may be routed over an existing LISL 315 with other traffic.

Figure 5:
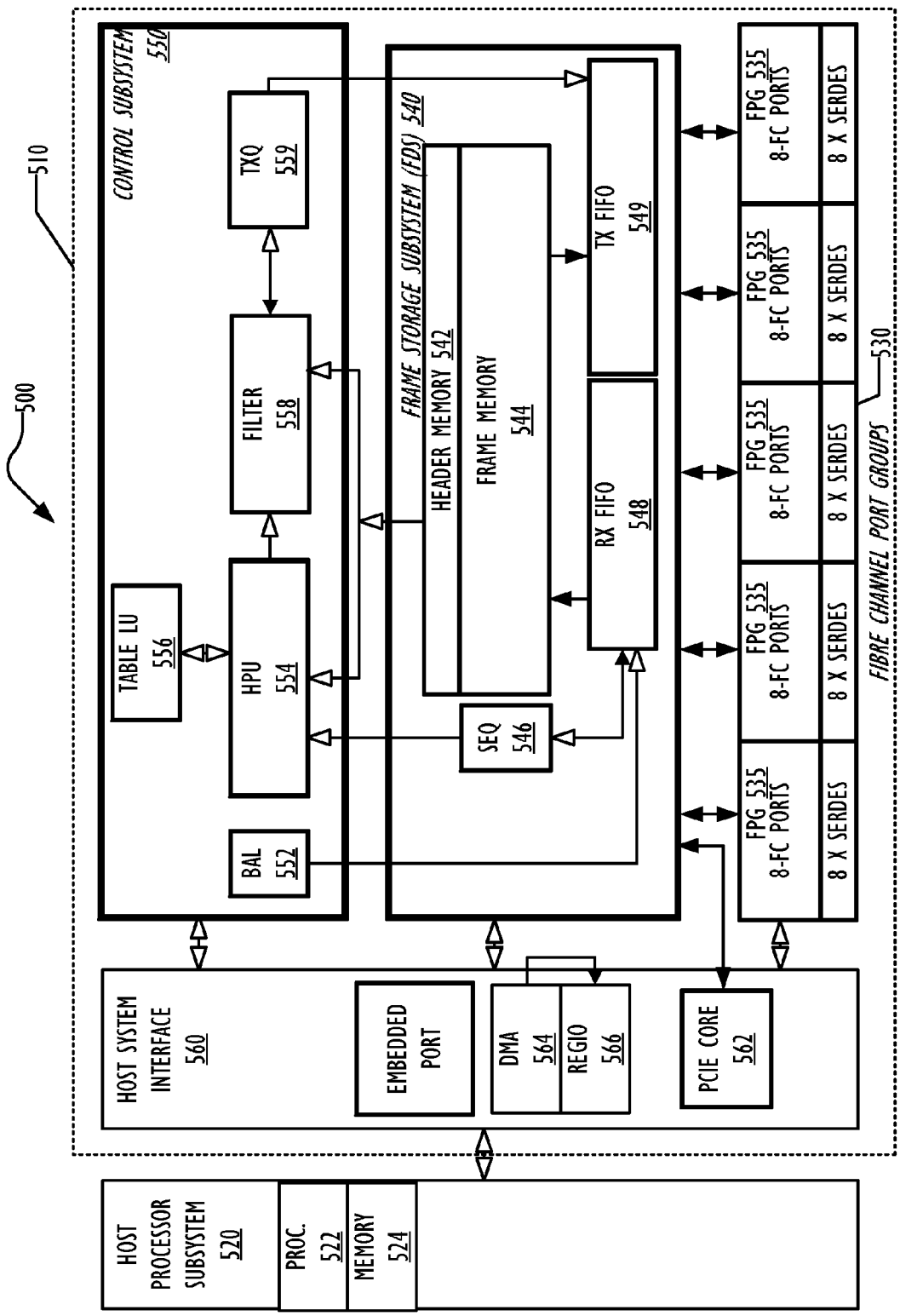
FIG. 5 is a block diagram illustrating a network switch according to one embodiment.

In one embodiment illustrated in FIG. 5, the functionality for allowing login to remote F_ports described above is implemented in hardware as a 40-port Fibre Channel switch ASIC 510 that is combinable with a host processor subsystem 520 to provide a complete 40-port Fibre Channel network switch 500. Multiple ASICs 510 can be arranged in various topologies to provide higher port count, modular switch chassis. The ASIC 510 and host processor system 520 are illustrative and by way of example only, and other hardware implementations can be used as desired.

The ASIC 510 comprises four major subsystems at the top-level as shown in FIG. 5: A Fibre Channel Protocol Group Subsystem 530, a Frame Storage Subsystem 540, a Control Subsystem 550, and a Host System Interface 560. Some features of the ASIC 510 that are not relevant to the current discussion have been omitted for clarity of the drawing.

The Fibre Channel Protocol Group (FPG) Subsystem 530 comprises 5 FPG blocks 535, each of which contains 8 port and SERDES logic blocks to a total of 40 E, F, and FL ports.

The Frame Data Storage (FDS) Subsystem 540 contains the centralized frame buffer memory and associated data path and control logic for the ASIC 510. The frame memory is separated into two physical memory interfaces: a header memory 542 to hold the frame header and a frame memory 544 to hold the payload. In addition, the FDS 540 includes a sequencer 546, a receive FIFO buffer 548 and a transmit buffer 549.

The Control Subsystem 550 comprises a Buffer Allocation unit (BAL) 552, a Header Processor Unit (HPU) 554, a Table Lookup Unit (Table LU) 556, a Filter 558, and a Transmit Queue (TXQ) 559. The Control Subsystem 550 contains the switch control path functional blocks. All arriving frame descriptors are sequenced and passed through a pipeline of the HPU 554, filtering blocks 558, until they reach their destination TXQ 559. The Control Subsystem 550 carries out L2 switching, FCR, LUN Zoning, LUN redirection, Link Table Statistics, VSAN routing and Hard Zoning.

The Host System Interface 560 provides the host processor subsystem 520 with a programming interface to the ASIC 510. It includes a Peripheral Component Interconnect Express (PCIe) Core 562, a DMA engine 564 to deliver frames and statistics to and from the host, and a top-level register interface block 566. As illustrated in FIG. 5, the ASIC 510 is connected to the Host Processor Subsystem 520 via a PCIe link controlled by the PCIe Core 562, but other architectures for connecting the ASIC 510 to the Host Processor Subsystem 520 can be used.

Some functionality described above can be implemented as software modules in an operating system or application running on a processor 522 of the host processor subsystem 520 and stored in a memory 524 or other storage medium of the host processor subsystem 520. This software may be provided during manufacture of the ASIC 510, or provided on any desired computer-readable medium, such as an optical disc, and loaded into the ASIC 510 at any desired time thereafter. This typically includes functionality such as the software that allows the creation and management of logical ports that are defined for the ASIC 510 and LISLs to connect logical ports, as well as user interface functions, such as a command line interface for management of the switch chassis 500.

In one embodiment, the control subsystem 550 is configured by operating system software of the network switch 500 executing in the processor 522 of the host processor subsystem 520. The control subsystem 550 may be configured by the software to perform the remote F_port login and data transport techniques described above upon initialization of the network switch 500 or upon receipt of a fabric login request from a device connected to a local F_port of the network switch 500.

Serial data is recovered by the SERDES of an FPG block 535 and packed into ten (10) bit words that enter the FPG subsystem 530, which is responsible for performing 8b/10b decoding, CRC checking, min and max length checks, disparity checks, etc. The FPG subsystem 530 sends the frame to the FDS subsystem 540, which transfers the payload of the frame into frame memory and the header portion of the frame into header memory. The location where the frame is stored is passed to the control subsystem, and is used as the handle of the frame through the ASIC 510. The Control subsystem 550 reads the frame header out of header memory and performs routing, classification, and queuing functions on the frame. Frames are queued on transmit ports based on their routing, filtering and QoS. Transmit queues de-queue frames for transmit when credits are available to transmit frames. When a frame is ready for transmission, the Control subsystem 550 de-queues the frame from the TXQ 559 for sending through the transmit FIFO back out through the FPG 530.

The Header Processor Unit (HPU) 554 performs header HPU processing with a variety of applications through a programmable interface to software, including (a) Layer2 switching, (b) Layer3 routing (FCR) with complex topology, (c) Logical Unit Number (LUN) remapping, (d) LUN zoning, (e) Hard zoning, (f) VSAN routing, (g) Selective egress port for QoS, and (g) End-to-end statistics.

The HPU 554 provides hardware capable of encapsulating and routing frames across inter-switch links that are connected to the ports 535 of the ASIC 510, including the transport of LISL frames that are to be sent across an XISL. The HPU 554 performs frame header processing and Layer 3 routing table lookup functions using routing tables where routing is required, encapsulating the frames based on the routing tables, and routing encapsulated frames. The HPU 554 can also bypass routing functions where normal Layer2 switching is sufficient.

Thus, the ASIC 510 can use the HPU 554 to perform the encapsulation, routing, and decapsulation, by adding or removing headers to allow frames for a LISL to traverse an XISL between network switches as described above at hardware speeds.

Figure 6:
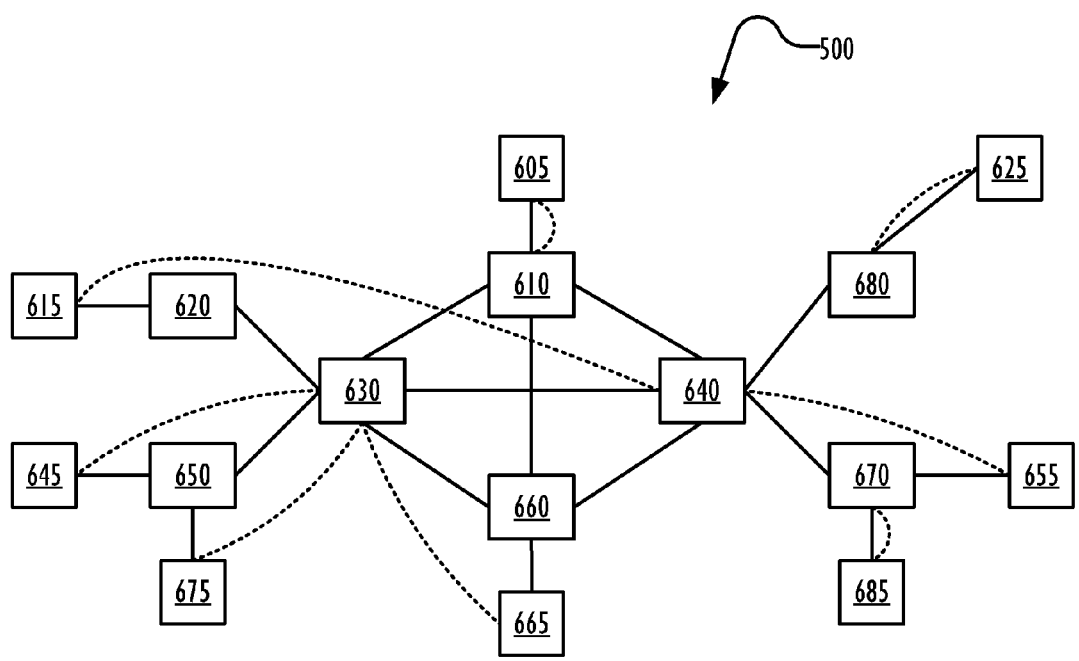
FIG. 6 is a block diagram of another SAN according to one embodiment.

FIG. 6 is block diagram illustrating a SAN 600 with a plurality of core switches 610, 630, 640, and 660, and a plurality of leaf or edge switches 620, 660, 670, and 680 according to embodiments described above. Hosts 605, 615, 645, 665, and 675 are connected to storage devices 625, 655, and 685 via the switches of the SAN 600. The solid lines connecting hosts, storage devices, and switches represent PISLs connecting those devices. The dashed lines connecting a host or storage device and a switch represent a remote login to the switch from the host or storage device.

Host 605 is physically connected and logged in to switch 610. Host 615 is physically connected to switch 620, but remotely logs in to switch 640 through switch 620 and transit switch 630. Hosts 645 and 675 are physically connected to switch 660, but remotely log in to switch 630. Host 665 is physically connected to switch 660, but remotely logs in to switch 630.

Storage device 625 is physically connected to and logs into leaf switch 680. Storage device 655 is physically connected to switch 670, but remotely logged in to core switch 610. Storage device 685 is physically connected to and logs in to switch 670.

Thus, as illustrated in FIG. 5, a leaf switch may provide local connectivity to one or more devices, may serve as a physical connection point for one or more devices that remotely login to a different switch, or a combination of the two. Similarly, a core switch may provide local connectivity to one or more devices, may serve as a physical connection point for one or more devices that remotely login to a different switch, may be a transit switch in between a leaf switch to which a device is physically connected and another switch to which the device remotely loved them, or any combination of the above.

Therefore, leaf switches 620 and 650 provide physical connectivity to hosts that remotely login to one of the core switches 630 and 640. Leaf switch 670 provides physical connectivity to storage device 655 that remotely logs in to core switch 640, but also provides physical connectivity and login functionality for storage device 685. Core switch 630 provides remote login services for hosts 645, 665, and 675, but also is a transit switch in the path of remote login frames between host 615 and the core switch 640. Core switch 610 provides physical connectivity to post 605, and may also be a transit switch, depending upon the protocol used for deciding which switch should be used for remote login by host 615. Core switch 640 provides remote login services for host 615 and storage device 655, but also is a transit switch for traffic for storage devices 625 and 685.

Figure 7:
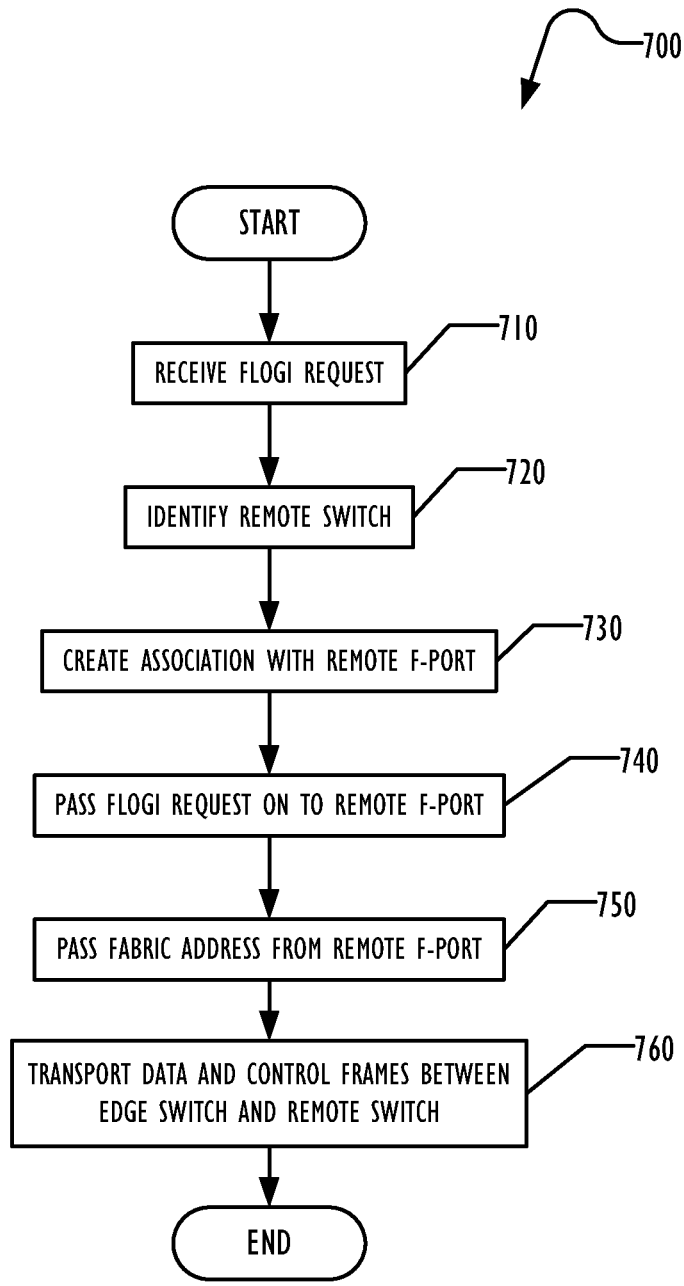
FIG. 7 is a flowchart illustrating a technique for providing remote F-ports according to one embodiment.

FIG. 7 is a flowchart illustrating a technique 700 for providing remote F_ports according to one embodiment. In block 710, the switch 120 receives an FLOGI request from the host 110. The switch 120 recognizes the FLOGI request and in block 720 identifies the remote switch 130 as the switch that is to provide the remote F_port for host 110. Although in this embodiment, the decision regarding the switch 130 is not made until the request is received from the host 110, in other embodiments, the identification of block 720 may be preconfigured. In this embodiment, a LISL is used for communication with the remote F_port. Therefore, in block 730, the switch 120 creates an association between the physical F_port 220 of the switch 120 and the logical F_port of the switch 130. In one embodiment, this may involve the creation of a logical port 310 and a logical ISL 315. In block 740, the switch 120 forwards the FLOGI request on to the remote F_port of the switch 130. The request is sent over the LISL created in block 730. The remote to switch 130 completes a fabric login process and returns a fabric address back to the host 110 across the LISL through the switch 120 in block 750. For the remainder of the session, in block 760 the switch 120 transport data and control frames across the LISL between the host 110 and the remote switch 130, as described above.

In conclusion, by allowing a leaf or edge switch to pass FLOGI requests and data frames on to another switch, a device connected to a SAN can remotely login to a logical F_port of the other switch, which may provide fabric services to the remotely logged in device. The leaf or edge switch manages the transport of data frames between the device and the remote switch. The remote switch may be multiple hops away from the leaf switch, and intervening transit switches do not need to have the remote login capability or even be aware of the existence of the remote login. Similarly, the device does not need to be aware that of the remote login, but may communicate with the leaf switch as if the device were logged in to the leaf switch.

While certain exemplary embodiments have been described in details and shown in the accompanying drawings, it is to be understood that such embodiments are merely illustrative of and not devised without departing from the basic scope thereof, which is determined by the claims that follow.

I claim:

1. A network switch, comprising:
a fabric port, configured to receive a fabric login request frame;
an expansion port;
a control subsystem, coupled to the fabric port and the expansion port;
a processor subsystem, coupled to the control subsystem, comprising:
a processor;
a storage medium, coupled to the processor;
a software stored on the storage medium, wherein the software, when executed by the processor, causes the processor to perform actions comprising:
configuring the control subsystem to send the fabric login request frame via the expansion port to an expansion port of another network switch;
configuring the control subsystem to receive a fabric address information frame responsive to the fabric login request frame via the expansion port from the another network switch; and
configuring the control subsystem to send the fabric address information frame via the fabric port.

2. The network switch of claim 1, further comprising:
a frame storage subsystem, coupled to the control subsystem, the processor subsystem, the fabric port, and the expansion port.

3. The network switch of claim 1, further comprising:
wherein the software, when executed by the processor, causes the processor to perform actions further comprising:
configuring the control subsystem to send frames between a device connected to the network switch and the another network switch via a logical inter-switch link defined between the network switch and the another network switch.

4. The network switch of claim 1, wherein the software, when executed by the processor, causes the processor to perform actions further comprising:
configuring the control subsystem to forward frames received via the fabric port to the expansion port and to forward frames received via the expansion port to the fabric port.

5. The network switch of claim 1, wherein the software, when executed by the processor, causes the processor to perform actions further comprising:
configuring the control subsystem to encapsulate a first frame received via the fabric port for delivery to the another switch and to decapsulate a second frame received from the another switch for delivery via the fabric port.

6. The network switch of claim 1, wherein the act of configuring the control subsystem to send the fabric login request frame via the expansion port to an expansion port of another network switch is performed responsive to receipt of the fabric login request frame by the network switch.

7. A network switch, comprising:
an expansion port;
a logical fabric port;
a control subsystem coupled to the expansion port;
a processor subsystem, coupled to the control subsystem, comprising:

a processor;

a storage medium; coupled to the processor;

a software stored on the storage medium, wherein the software, when executed by the processor, causes the processor to perform actions comprising:

configuring the control subsystem to associate the expansion port and the logical fabric port;

configuring the control subsystem to receive a fabric login request frame via the expansion port from another network switch;

configuring the control subsystem to pass the fabric login request frame from the expansion port to the logical fabric port;

configuring the control subsystem to pass a fabric address information frame from the logical fabric port to the expansion port, responsive to the fabric login request frame; and configuring the control subsystem to send via the logical fabric port frames destined for a source of the fabric login request.

8. The network switch of claim 7, wherein the act of configuring the control subsystem to pass the fabric address information frame sent from the logical fabric port to the expansion port is performed upon receipt of the fabric login request frame.

9. The network switch of claim 7, wherein the control subsystem comprises:

logic to encapsulate frames to be sent via the logical fabric port through the expansion port and to decapsulate frames received by the expansion port destined for the logical fabric port.

10. The network switch of claim 7, further comprising:

a frame storage subsystem, coupled to the control subsystem, the processor subsystem, the expansion port, and the logical fabric port.

11. The network switch of claim 7, wherein the software, when executed by the processor, causes the processor to perform actions further comprising:

configuring the control subsystem to associate the logical fabric port with a logical link defined between the network switch and the another network switch, and to send frames from the logical fabric port via the logical link.

12. A method comprising:

receiving by a first network switch a fabric login request from a device connected to a fabric port of the first network switch;

logging the device into a logical fabric port of a second network switch, comprising:

sending the fabric login request from the first network switch to the second network switch via an expansion port of the first network switch and an expansion port of the second network switch;

logging the device into the logical fabric port of the second network switch:

sending a response to the fabric login request from the second network switch to the first network switch via the expansion port of the second network switch and the expansion port of the first network switch;

forwarding to the device by the first network switch the response to the fabric login request received from the second network switch; and transporting frames between the device and the logical fabric port of the second network switch through the first network switch.

13. The method of claim 12, wherein the act of transporting frames between the device and logical port of the second network switch through the first network switch comprises:

forwarding the frames between the device and the second network switch using a routing protocol.

14. The method of claim 12, wherein the act of transporting frames between the device and the logical port of the second network switch through the first network switch comprises:

configuring a logical link between the first network switch and the second network switch, wherein the logical link uses one or more physical links for transporting frames for the logical link.

15. The method of claim 12, further comprising:

selecting the second network switch to provide fabric services to the device.

16. The method of claim 15, wherein the act of selecting the second network switch to provide fabric services to the device comprises:

selecting the second network switch from a plurality of network switches forming a network of network switches based on a desired criteria and properties associated with each of the plurality of network switches and the network of network switches.

17. The method claim 15, wherein the act of selecting the second network switch to provide fabric services to the device comprises:

selecting the second network switch from a plurality of network switches based upon a shortest path protocol.

18. The method of claim 12, wherein the act of transporting frames between the device and the logical fabric port of the second network switch through the first network switch comprises:

encapsulating frames received from the device for transport across a logical link defined between a logical port of the first network switch and the logical fabric port of the second network switch.

19. The method of claim 18, wherein the act of transporting frames between the device and the logical fabric port of the second network switch through the first network switch further comprises:

decapsulating frames received from the second network switch for transport via a fabric port of the first network switch to the device.

20. The method of claim 12, wherein the act of transporting frames between the device and the logical fabric port of the second network switch through the first network switch comprises:

encapsulating frames from the device for transport across a logical link between a logical port of the first network switch and the logical fabric port of the second network switch.

21. The method of claim 12, wherein the act of transporting frames between the device and the logical fabric port of the second network switch through the first network switch comprises:

encapsulating frames received from the device for transport via an expansion port of the first network switch to the second network switch and decapsulating frames received from the second network switch via the expansion port and the first logical fabric port for delivery via a node port of the first network switch to the device.

22. The method of claim 12, wherein the first network switch is a logical network switch partitioned from a first physical network switch.

23. The method of claim 12, wherein the second network switch is a logical network switch partitioned from a second physical network switch.

24. The method of claim 12, wherein the act of transporting frames between the device and the logical port of the second network switch for the first network switch comprises:

transporting frames between the first network switch and the second network switch through a transit network switch.

25. A non-transitory computer readable medium, on which is stored instructions which, when executed by a processor of a network switch having a fabric port and a expansion port, cause the network switch to perform actions comprising:
  configuring a control subsystem of the network switch to send a fabric login request frame via an expansion port to an expansion port of another network switch, wherein the fabric login request frame is received from a device connected via a fabric port of the network switch;
  configuring the control subsystem to receive a fabric address information frame responsive to the fabric login request frame via the expansion port from the another network switch;
  configuring the control subsystem of the network switch to send the fabric address information frame via the fabric port; and
  configuring the control subsystem of the network switch to transport frames between the device and a logical fabric port of the another network switch.

26. A non-transitory computer readable medium, on which is stored instructions which, when executed by a processor of a network switch, cause the network switch to perform actions comprising:
  configuring a control subsystem of the network switch to associate an expansion port of the network switch with a logical fabric port of the network switch;
  configuring the control subsystem to receive via the expansion port from another network switch a fabric login request frame for a device connected to the another network switch;
  configuring the control subsystem to pass the fabric login request from the expansion port to the logical fabric port;
  logging the device into the logical fabric port;
  configuring the control subsystem to send a response to the fabric login request to the another network switch via the logical fabric port and the expansion port of the network switch; and
  configuring the control subsystem of the network switch to transport frames between the network switch and the device through the another network switch.

* * * * *